US008798611B2

(12) United States Patent
Capuozzo et al.

(10) Patent No.: US 8,798,611 B2
(45) Date of Patent: Aug. 5, 2014

(54) MOBILE NETWORK MONITORING

(75) Inventors: Giuseppe Capuozzo, Rome (IT); Marco Borghini, Rome (IT); Giovanni Persia, Rome (IT)

(73) Assignee: Accenture Global Services Limited, Dublin (IE)

( * ) Notice: Subject to any disclaimer, the term of this patent is extended or adjusted under 35 U.S.C. 154(b) by 481 days.

(21) Appl. No.: 13/024,132

(22) Filed: Feb. 9, 2011

(65) Prior Publication Data

US 2011/0201364 A1 Aug. 18, 2011

(30) Foreign Application Priority Data

Feb. 12, 2010 (EP) .................................... 10425032

(51) Int. Cl.
*H04M 3/00* (2006.01)
*H04W 24/10* (2009.01)
*H04W 24/08* (2009.01)

(52) U.S. Cl.
CPC .............. *H04W 24/10* (2013.01); *H04W 24/08* (2013.01)
USPC ........... 455/418; 455/419; 455/567; 455/466; 370/252; 370/351; 370/410; 370/230; 370/253; 709/203

(58) Field of Classification Search
USPC .............. 455/452.2, 450, 405, 423, 411, 466, 455/419, 567; 370/252, 253, 236, 254, 410, 370/230, 389; 717/174, 105; 709/203
See application file for complete search history.

(56) References Cited

U.S. PATENT DOCUMENTS

| | | | | |
|---|---|---|---|---|
| 2004/0058651 | A1 | 3/2004 | Ross et al. | |
| 2005/0258938 | A1 * | 11/2005 | Moulson | 340/7.58 |
| 2006/0198359 | A1 | 9/2006 | Fok et al. | |
| 2007/0041330 | A1 | 2/2007 | Bostica et al. | |
| 2008/0181116 | A1 * | 7/2008 | Kavanaugh et al. | 370/236 |
| 2008/0207235 | A1 * | 8/2008 | Choi | 455/466 |
| 2009/0040942 | A1 * | 2/2009 | Yang | 370/253 |
| 2009/0258634 | A1 * | 10/2009 | Amine | 455/413 |
| 2010/0020717 | A1 * | 1/2010 | McGregor et al. | 370/252 |
| 2010/0255890 | A1 * | 10/2010 | Mikkelsen et al. | 455/567 |
| 2010/0306759 | A1 * | 12/2010 | Kohler et al. | 717/174 |
| 2011/0090812 | A1 * | 4/2011 | Aoyama | 370/252 |
| 2011/0154287 | A1 * | 6/2011 | Mukkamala et al. | 717/105 |
| 2012/0287858 | A1 * | 11/2012 | Klein et al. | 370/328 |
| 2013/0024382 | A1 * | 1/2013 | Dala et al. | 705/51 |

FOREIGN PATENT DOCUMENTS

| | | | |
|---|---|---|---|
| WO | WO 99/57823 | A2 | 11/1999 |
| WO | WO 2007/113296 | A1 | 11/2007 |

OTHER PUBLICATIONS

Extended European Search Report dated Sep. 9, 2010 for corresponding European Patent Office Application No. 10 42 5032.9.
Examination Report dated Jul. 5, 2013 from corresponding European Application No. 10 425 032.9, 8 pages.

* cited by examiner

*Primary Examiner* — Patrick Edouard
*Assistant Examiner* — Fred Casca
(74) *Attorney, Agent, or Firm* — Brinks Gilson & Lione

(57) ABSTRACT

The present description refers in particular to a computer-implemented method, a computer program product and a device for measuring QoS in a mobile network, the method comprising: accessing at least one platform dependent API on a mobile device; obtaining, according to a set of QoS parameters, a first plurality of QoS measurement values from the mobile device by means of the API; and sending the first plurality of QoS measurement values to a first server.

22 Claims, 11 Drawing Sheets

500

```
- <configuration>
  - <campaign>                                              501
      <type>voice</type>                                    502
      <role>caller</role>                                   504
    - <endpoint>
        <call>+393331234567</call>                          506
      </endpoint>
    - <campaign_duration>
        <start>27/01/2010 18:00:00</start>                  508
        <end>28/01/2010 10:00:00</end>                      510
512     <frequency>200</frequency>
        <session_duration>60</session_duration>             514
      </campaign_duration>
    - <sampling>
        <frequency>1</frequency>                            516
      </sampling>
    - <log>
        <frequency>3600</frequency>                         518
      </log>
    </campaign>
  - <campaign>                                              519
      <type>data</type>                                     520
    - <endpoint>
        <url>http://www.accenture.com</url>                 522
      </endpoint>
    - <campaign_duration>
        <start>27/01/2010 18:00:00</start>
        <end>28/01/2010 10:00:00</end>
        <frequency>200</frequency>
        <session_duration>10</session_duration>
      </campaign_duration>
    - <sampling>
        <frequency>1</frequency
      </sampling>
    - <log>
        <frequency>3600</frequency>
      </log>
    </campaign>
  </configuration>
```

FIG. 5

```
<!ELEMENT call ( #PCDATA ) >
<!ELEMENT campaign ( campaign_duration | endpoint | log | role | sampling | type )* >
<!ELEMENT campaign_duration ( start, end, frequency, session_duration ) >
<!ELEMENT configuration ( campaign+ ) >
<!ELEMENT end ( #PCDATA ) >
<!ELEMENT endpoint ( call, url? ) >
<!ELEMENT frequency ( #PCDATA ) >
<!ELEMENT log ( frequency ) >
<!ELEMENT role ( #PCDATA ) >
<!ELEMENT sampling ( frequency ) >
<!ELEMENT session_duration ( #PCDATA ) >
<!ELEMENT start ( #PCDATA ) >
<!ELEMENT type ( #PCDATA ) >
<!ELEMENT url ( #PCDATA ) >
```

Figure 6

IMEI=12345678

MSISDN=+391234567

702 error_code=2;

704 time= 1265274081;

706 free_memory=2048000;

708 last_measure=1265264043;

710 last_day_measurement=150

Figure 7

*error_code=2;time= 1265274081;free_memory=2048000*

| Ref. | Field | Type | Function | Null | Value |
|---|---|---|---|---|---|
| | id | int(11) | | | 1717 |
| | callid | int(11) | | | -1 |
| 905 | imei | varchar(50) | | | 356795020356312 |
| 906 | imsi | varchar(15) | | | 222014401303279 |
| 908 | remote_party | varchar(100) | | | +393331234567 |
| 910 | dialling_ts | datetime | | | 2009-01-15 19:41:41 |
| 912 | dialling_ts_mills | int(11) | | | 881 |
| 914 | disconnecting_ts | datetime | | | 2009-01-15 19:53:06 |
| 916 | disconnecting_ts_mills | int(11) | | | 883 |
| 918 | exit_code | int(11) | | | -2280887298 |
| 920 | direction | int(11) | | | 1 |
| 922 | location | int(11) | | | 51299 |
| 924 | cell_id | int(11) | | | 4653 |
| 926 | mode | int(11) | | | 2 |
| 928 | mcc | varchar(4) | | | 222 |
| 930 | mnc | varchar(8) | | | 01 |
| 932 | band | int(11) | | | 0 |
| 934 | registration_status | int(11) | | | -1 |
| 936 | signal_level | int(11) | | | 88 |
| 938 | signal_bar | int(11) | | | 6 |
| 940 | connected_ts | datetime | | ☐ | 2009-01-15 19:41:51 |
| 942 | connected_ts_mills | int(11) | | ☐ | 849 |

1006 CONNECTED;15/1/2009 19:41:51,849.

1008 SURVEY;0;0

1010 NETWORK;51299;38445;2;222;01;0;-1;76;7

1014 GPS;41.861507;12.528191

Figure 10

MOBILE NETWORK MONITORING

BACKGROUND OF THE INVENTION

1. Technical Field

The present application relates to a computer-implemented method, a computer program product and a system for measuring Quality of Service (QoS) in a mobile network.

2. Priority Claim

This application claims the benefit of European Patent Office (EPO) Application No. 10 425 032.9-2412, filed on Feb. 12, 2010 and is incorporated herein by reference in its entirety.

3. Background

A mobile network may be very large in terms of the number of components, geographic extent, and the number of users. Measuring Quality of Service (QoS) in a mobile network may facilitate understanding and analysis of the network, allow better network planning, better user experience, and continuous optimization based on, e.g., environment evolution.

QoS in a mobile network may be measured from the perspective of an expert, such as a teletraffic engineer. This may involve assessing the network to see if it delivers the quality that a network planner intended to target. Certain tools and methods including protocol analysers, drive tests, and operation and maintenance measurements can be used for QoS measurement. Because of the size of some mobile networks and the sophistication and expense of some of the measurement instruments, fully distributed measurement can be difficult.

SUMMARY

According to an aspect, a computer-implemented method of measuring QoS in a mobile network is provided. The method may comprise: accessing at least one platform dependent API on a mobile device; obtaining, according to a set of QoS parameters, a first plurality of QoS measurement values from the mobile device by means of the API; and sending the first plurality of QoS measurement values to a first server.

In addition, the set of QoS parameters may include at least one of the following: a cell identifier; a received signal strength indication; an absolute radio frequency channel number; power of a signal on a primary common pilot channel; position data obtained using a global navigation satellite system; received signal code power; and volume of data transmitted and received.

Moreover, the method may comprise: receiving a first trigger at the mobile device; downloading configuration parameters to the mobile device in response to the first trigger; and wherein obtaining the first plurality of QoS measurement values is performed under conditions defined by the configuration parameters. The first trigger may be received from the configuration manager.

The first trigger may be an SMS message, and the SMS message may include a pointer to a first server. The pointer may be implemented as a URL. Furthermore, the method may comprise: receiving a second trigger at the mobile device, wherein the second trigger includes a second pointer to a second server; obtaining, according to the set of QoS parameters, a second plurality of QoS measurement values from the mobile device by means of the API; sending the second plurality of QoS measurement values to the second server.

In some embodiments, obtaining the first plurality of QoS measurement values is carried out by monitoring normal usage of the mobile device. In this case, a default server may be on specified on the mobile device or a server specified in received configuration parameters may be used.

In some cases, the method may further comprise providing an indication of a status of the mobile device to the first server. The indication of the status of the mobile device may include more than 160 bytes of data. This may mean that the indication includes more data than an SMS message can contain.

It may be that, when the mobile device includes a Symbian operating system, the at least one platform dependent API uses Symbian C++; when the mobile device includes an Android operating system, the at least one platform dependent API uses an Android Java library; when the mobile device includes a Windows Mobile operating system, the at least one platform dependent API uses C++; and when the mobile device includes a Blackberry operating system, the at least one platform dependent API uses a Blackberry Java library.

In some cases, the configuration parameters may comprise a type parameter, and wherein the type parameter indicates that the first plurality of QoS measurement values are obtained by measuring QoS for at least one of the following: audio calls, and video calls. Also, the configuration parameters may comprise a sampling frequency, and wherein the sampling frequency specifies an amount of time between obtaining a first part of the first plurality of QoS measurement values and a second part of the first plurality of QoS measurement values. The method may further comprise: receiving a response to a query of a user of the mobile device, wherein the response includes a quality of service perceived by the user, and/or a characteristic of a location where the mobile device was used; obtaining a third plurality of QoS measurement values from the mobile network; comparing the first plurality of QoS measurement values, the response to the query, and the third plurality of QoS measurement values.

According to another aspect, a computer program product is provided. The computer program product may comprise computer-readable instructions, which, when loaded and executed on a computer system, cause the computer system to perform operations according to the method steps listed above.

According to yet another aspect, a device is provided. The device may comprise: means for accessing at least one at least one platform dependent API on the device; means for obtaining, according to a set of QoS parameters a first plurality of QoS measurement values from the mobile device by means of the API; and means for sending the first plurality of QoS measurement values to a first server. The device may be configured to perform operations according to the method steps listed above.

Advantageously, by obtaining measurements from a mobile device, it is possible to measure QoS in a mobile network from the perspective of the users of the network. Obtaining measurements from a mobile device also makes it possible to measure QoS in a distributed manner. Moreover, by using a platform dependent API on a mobile device it is possible to measure QoS without using expensive instruments.

Technical Definitions

A mobile network may be understood as a group of interconnected computers and/or mobile devices, at least one of which communicates wirelessly. A computer may communicate wirelessly using local area technologies such as Wireless Fidelity (WiFi), or wide area wireless technologies such as General Packet Radio Service (GPRS), High Speed Packet Access, or Worldwide Interoperability for Microwave Access (WiMAX). Other suitable communication technologies are also possible.

A mobile device may refer to a device in a mobile network capable of wireless communication. Examples of mobile devices are smart phones, mobile phones, Personal Digital Assistants (PDAs), pagers, and other electronic devices that can connect to a mobile network, and can be used to transmit and receive data.

An Application Programming Interface (API) may refer to computer code that supports application access to operating system functionality. A platform dependent API may be understood to rely on the functionality of a particular software platform. Accordingly, a program configured to access a platform dependent API on a mobile device using a first software platform might need to access a different platform dependent API on a mobile device using a second software platform. The platform dependent API may use device specific libraries or native code allowing access to the mobile device at a low level.

Normal usage of a mobile device may be understood to include activities performed by a user of the mobile device, such as an audio/video call, or receiving/transmitting data (e.g., messaging/SMS). Normal usage may include typical day-to-day use of the mobile device.

A Quality of Service (QoS) parameter may refer to the reliability, performance and/or usability of a mobile network. Quality of Service may be affected by various "human" and "technical" factors. Human factors may include: stability of service, availability of service, delays, user information, etc. Technical factors may include: reliability, scalability, effectiveness, maintainability, Grade of Service (GOS), etc. Metrics that may be used to measure QoS include but are not limited to: the coverage, accessibility (includes GOS), and the audio quality of a mobile network. To determine the coverage metric, the strength of the signal may be measured. The accessibility metric relates to the ability of the network to handle successful calls from mobile-to-fixed networks and from mobile-to-mobile networks. The audio quality metric may be determined by monitoring a successful call for a period of time for the clarity of the communication channel. Other metrics may also be used. A QoS measurement value may be a quantity that corresponds to a QoS measurement parameter. A user agent (UA) or QoS monitoring agent may be understood as a software application that runs on a mobile device, e.g., a software application that obtains QoS measurement values from the mobile device.

The subject matter described in this specification can be implemented as a method or on a device, including in the form of one or more computer program products. The subject matter described in the specification can be implemented in a data signal or on a machine readable medium, where the medium may be tangible or non-transitory and may be embodied in one or more information carriers, such as a CD-ROM, a DVD-ROM, a semiconductor memory, or a hard disk. Such computer program products may cause a data processing apparatus to perform one or more operations described in the specification.

In addition, subject matter described in the specification can also be implemented as a system including a processor, and a memory coupled to the processor. The memory may store or encode one or more programs to cause the processor to perform one or more of the methods described in the specification when the processor executes the program instructions. Further subject matter described in the specification can be implemented using various machines.

Details of one or more implementations are set forth in the exemplary drawings and description below. Other features will be apparent from the description, the drawings, and from the claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 5 shows exemplary voice and data campaign configurations.

FIG. 6 shows a DTD for voice and data campaign configurations.

FIG. 7 shows an HTTP keep-alive message sent from a user agent to a server.

FIG. 8 shows an SMS keep-alive message sent from the user agent to the server.

FIG. 9 shows exemplary QoS parameters and corresponding QoS measurement values.

FIG. 10 shows exemplary measured data sent from the user agent to the server.

DETAILED DESCRIPTION

In the following text, a detailed description of examples will be given with reference to the drawings. It should be understood that various modifications to the examples may be made. In particular, one or more elements of one example may be combined and used in other examples to form new examples.

Figure 1:
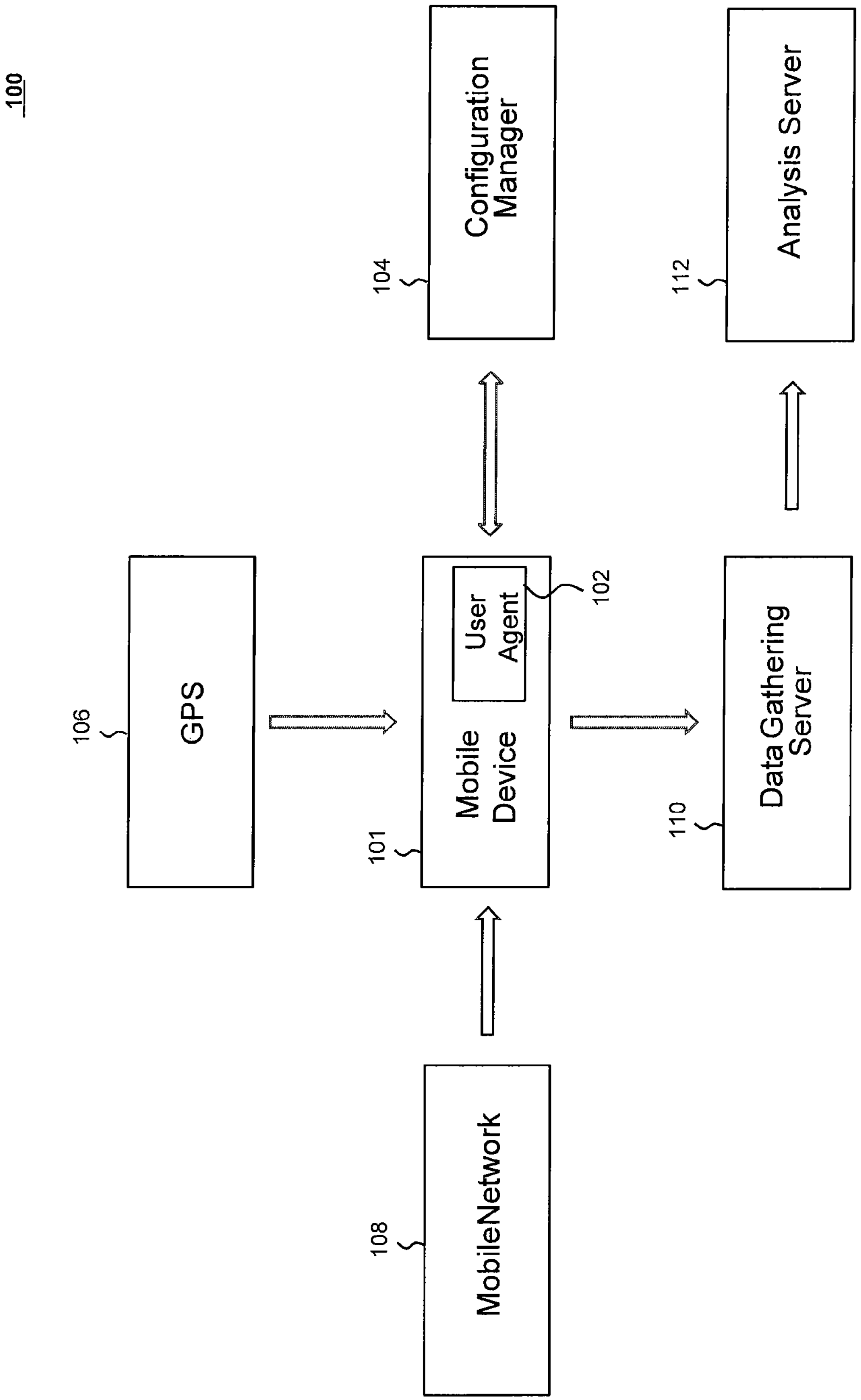
FIG. 1 shows a block diagram of an exemplary architecture for a quality of service monitoring framework.

FIG. 1 shows a block diagram of an exemplary architecture for a quality of service monitoring framework 100. A user agent (UA) 102, also referred to as a Quality of Service (QoS) monitoring agent, may be installed on a mobile device 101. A configuration manager 104, also referred to as a campaign configuration manager, can be used to define configuration parameters of QoS measurement campaigns and manage the user agent 102. The configuration manager 104 may also enable control and monitoring of the mobile device 101 hosting the user agent 102. In this specification, monitoring QoS and measuring QoS may refer to the same actions.

In some cases, the user agent 102 runs in the background on the mobile device 101. Accordingly, in these cases, the mobile device 101 should have a multitasking operating system (OS) (e.g., Symbian™ OS, Android™ OS, Blackberry™ OS), i.e., it should be possible to run more than one application at a time.

The user agent 102 may access at least one platform dependent API on the mobile device 101. Accessing the at least one platform dependent API may include adding a reference in source code to a library that contains the API. For example, in the case of the Symbian OS and the S60 software platform, the reference in the source code could refer to the etel3rdparty.lib library. Accessing the at least one platform dependent API may further include adding a reference to a header file of the API, e.g., for Symbian OS with S60: #include <Etel3rdParty.h>.

Adding a reference to the header file may also be referred to as including or importing the API class package. Moreover, accessing the at least one platform dependent API may include using a class from the API along with one or more methods of the class. For example, with Symbian OS and S60 and the CTelephony class, the following code could be used in order to obtain QoS measurement values according to the signal strength (RSSI) QoS parameter:

```
CTelephony* iTelephony;
iTelephony->GetSignalStrength( );
```

The use of only some of these steps or their combination with other steps in order to access a platform dependent API is also possible. QoS measurement values may be obtained under conditions defined by configuration parameters received from the configuration manager 104. Exemplary configurations parameters defining QoS voice and data measurement campaigns are shown in FIG. 5.

A global navigation satellite system (GNSS) such as the Global Positioning System (GPS) 106 or the Galileo Positioning System may be used to obtain a location (also referred to as position data) of the mobile device 101. The location obtained from the GPS 106 can be considered a QoS parameter. The value of the location obtained from the GPS 106 at a specific time can be considered a QoS measurement value. It may be useful to correlate other QoS measurement values with GPS location values.

The user agent 102 can be used to measure at least the following QoS parameters, as shown in Table 1—Parameters collected by user agent, as well as parts thereof:

TABLE 1

Parameters collected by user agent

| Parameter Name | Description |
|---|---|
| Mobile Originated/ Terminated session | whether session originates or terminates at the mobile device |
| Failed attempt | whether it was not possible set-up a session |
| Failed Session Causes | causes of failure to setup the session |
| Dropped Session Causes | causes of a dropped session |
| Start Session Timestamp | Date and time of start of session |
| End Session Timestamp | Date and time of end of session |
| Network Mode | network mode of mobile device, e.g., GPRS, HSPA |
| Monitored IMSI | International Mobile Subscriber Identity of mobile device |
| Monitored IMEI | International Mobile Equipment Identity of mobile device |
| Other party MSISDN/ Requested URL | Telephone number of remote party (for voice session) or Uniform Resource Locator (for data session) |
| BCCH parameters | obtained from Broadcast Control Channel |
| Downlink and uplink power measurements | Measurements of transmitted and received signal |
| Downlink and uplink data volume; reception/ transmission time | Amount of data exchanged in both directions (downlink and uplink). Duration of data session. |
| Handover failure | If an handover failure occurs, it indicates the cause of failure |
| GPS | Latitude and Longitude of the mobile device at start of session |
| MOS | Mean Opinion Score |

The BCCH parameters referred to in Table 1 may include a Cell ID, Location Area Code (LAC), Mobile Network Code (MNC), Mobile Country Code (MCC), Received Signal Strength Indication (RSSI), and Uplink Absolute Radio Frequency Channel Number (U-ARFCN). The broadcast control channel (BCCH) may be understood as a point to multipoint, unidirectional (downlink) channel used in the Um Interface of a Global System for Mobile communications (GSM) cellular standard. The BCCH may carry a repeating pattern of system information messages that describe the identity, configuration and available features of the base transceiver station (BTS). The messages may be implemented as described in GSM Specification 04.08 Sections 9.1.31-9.1.43.

The downlink and uplink power measurements, as referred to in Table 1, may include one or more of the following: transmitted power of the mobile device 101, Common Pilot Channel (CPICH), Received Signal Code Power (RSCP), CPICH EC/10, RSSI, Received Signal Level (RXLEV), and Received Signal Quality (RXQUAL). RXLEV indicates the average signal strength received. EC/10 may refer to the portion of the Radio Frequency (RF) signal which is usable. Thus EC/10 is the difference between the signal strength (total power of RF received) and the noise floor (unusable part of the received signal). Power measurements may be obtained when the mobile device 101 is idle or when the mobile device 101 is connected to the mobile network 108.

Regarding Table 1, the Mobile Originated/Terminated session parameter indicates whether a data session is initiated by the mobile device 101. The drop session causes parameter may indicate that a session has ended normally or abnormally along with a reason that the session was dropped. Moreover, the downlink and uplink data volume and reception/transmission time parameter may provide a measure of bandwidth and may not be available for a voice call session. The MOS may not be available for a data session.

In one example, using the Symbian Operating System (OS) and the S60 software platform, the failed session causes, dropped session causes and handover failure parameters may be obtained using a Telephony API, e.g., the CTelephony class in the etel3rdparty Jib library. Accordingly, the Telephony API may be configured to provide asynchronous callbacks that are triggered when an error (e.g., a failed session) occurs. The downlink and uplink power measurements may also be determined using the Telephony API, e.g., via synchronous functions called periodically by the user agent 102. Downlink and uplink transmission rates may be determined by obtaining an amount of Transmission Control Protocol (TCP) data in bytes transmitted/received from a Socket API, i.e., RHTTPRequest RHTTPResponse RHTTPSession, and RHTTPTransaction classes in the http.lib library. A rate in bytes per second for uplink and downlink transmission may be calculated using an elapsed time in seconds. Measurement values for the GPS parameter may be obtained using a Location API, in this example, the RPositioner class in the Ibs.lib library. SMS communications may be provided using RSendAs and TSmsUtilities classes in the sendas2.lib, smcm_gsm.lib, smcm_cdma.lib library.

In another example, using the Android operating system, analysis of telephone communication services, such as causes of failed sessions, dropped sessions, handover failure, and downlink and uplink power measurements, may be performed using APIs from the android.telephony package. Analysis of data communication, e.g., calculating uplink and downlink transmission in bytes per second, may be performed with APIs from the android.net package. GPS measurements may be obtained using APIs from the android.location package. SMS communications may be provided using APIs from the android.telephony package.

In yet another example, using the Blackberry OS, analysis of telephone communication services may be performed with APIs from the net.rim.blackberry.api.phone package, GPS measurements may be obtained using APIs from the javax.microedition.location package, data communication analysis may be performed using APIs from the javax.microedition.io package, and SMS communications may be provided using APIs from the javax.wireless.messaging package. Symbian is a trademark of the Symbian foundation, Android is a trademark of the Google Corporation and Blackberry is a trademark of Research in Motion.

It may also be possible to obtain QoS measurements from the mobile network 108 using custom network equipment. However, such equipment can be expensive. In addition, it may also be possible to obtain QoS measurements from the mobile device 101 using platform independent APIs. However, with platform independent APIs, it may not be possible to achieve the level of precision that can be achieved using platform dependent APIs according to the invention.

Upon receipt of configuration parameters (also referred to as configuration settings) from the configuration manager 104, the user agent 102 may start monitoring network QoS under conditions defined by the configuration parameters. The mobile device 101 hosting the user agent 102 may be connected to a mobile network 108 or the mobile device 101 may be idle.

The user agent 102 may periodically send logs to a data gathering server 110. The data gathering server 110 may collect QoS measurement values received from the user agent 102 and possibly other user agents as well. The data gathering server 110 may aggregate data collected from multiple user agents (e.g., user agent 102). The data aggregated by the data gathering server 110 may be further analyzed at the data gathering server 110, or on another, possibly dedicated, system. Data collected from user agents, including user agent 102, may be analyzed alongside data regarding the intended operation of the mobile network 108, and perceived QoS data obtained directly from users. This analysis may provide insight into flaws in the design of mobile network 108 or areas of mobile network 108 that need improvement.

The data gathering server 110 may be configured with an agent interface and an analysis Interface. The agent interface may be implemented as an HTTP interface that allows user agents, including user agent 102, to upload measurement data. Measurement data may be uploaded, e.g., as a plain text file, also referred to as a data file. When a new data file is uploaded to the data gathering server 110, it may be processed and the data may be inserted in a database. The analysis interface may be implemented so that it can be accessed using HTTP. The analysis interface may be used by external systems in order to retrieve QoS measurement values from the data gathering server 110.

Data from the data gathering server 110 may be analyzed on an analysis server 112. In particular, a cross check may be performed between data measured by user agents, including user agent 102, and a map of the mobile network 108, in order to graphically represent QoS measurements on the mobile network 108.

Although the configuration manager 104, the data gathering server 110 and the analysis server 112 are depicted as separate systems in FIG. 1, the functionality of one or more of these servers may be combined on one computer system. In addition, functions performed by one of these computer systems may be performed by a different computer system. For example, functions performed by the data gathering server 110 may optionally be performed by the configuration manager 104.

Figure 2:
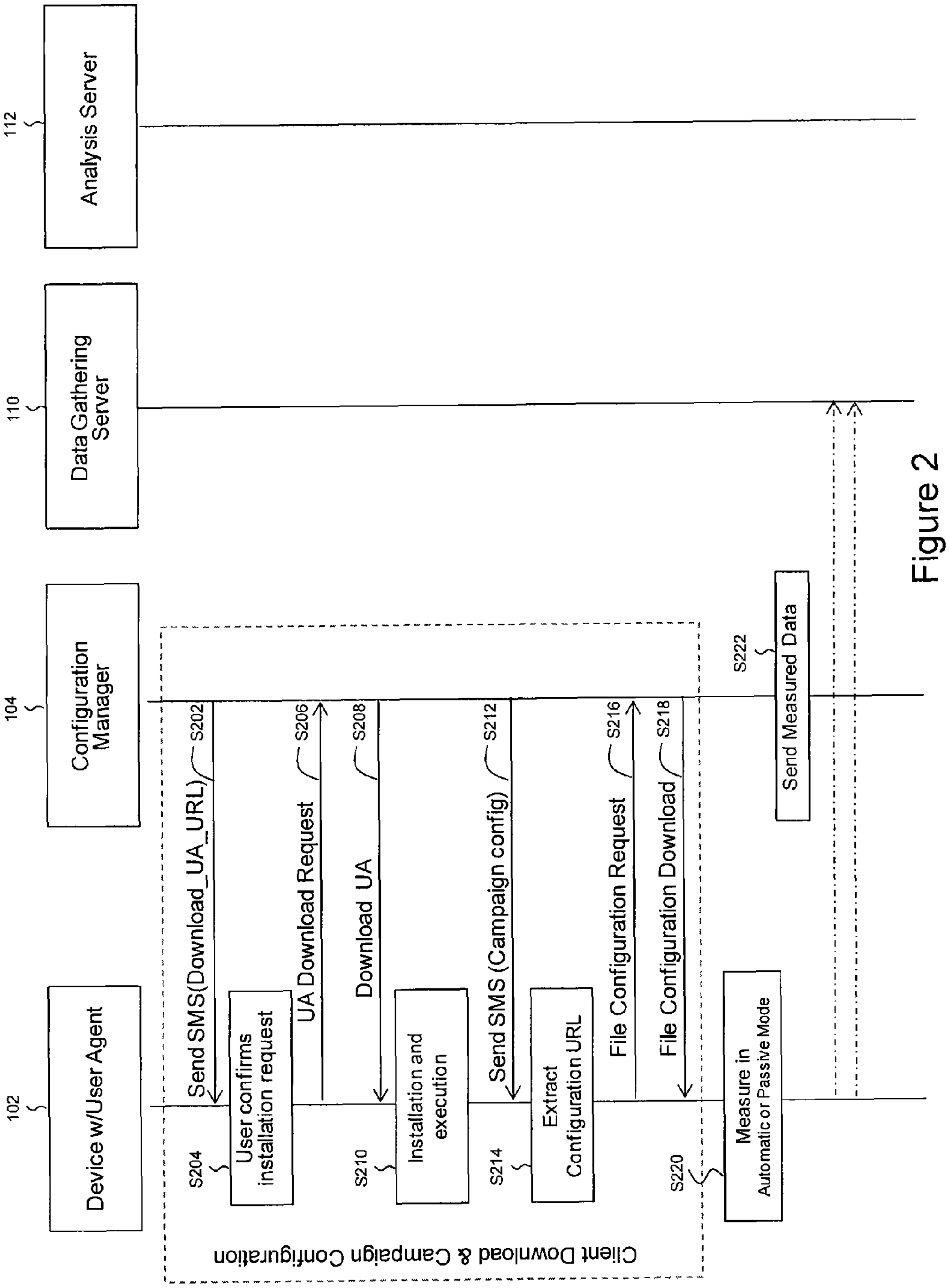
FIG. 2 shows a flow chart of a process for downloading and configuring a user agent.

FIG. 2 shows a flow chart of a process for downloading and configuring the user agent 102. According to the example depicted, at step S202 the configuration manager 104 may send a short message service (SMS) message to the mobile device 101. The SMS message includes a Uniform Resource Locator (URL) that can be used to download the user agent 102. At the mobile device 101, a user may confirm the installation request at step S204, request to download the user agent 102 at step S206, and download the user agent 102 at step S208. The user agent 102 may be installed and run on the mobile device 101 at step S210. In some cases, the user agent 102 runs in the background on the mobile device 101, i.e., without interrupting normal, everyday use of the mobile device 101. It is possible that steps S202 to S210, including downloading and installing the user agent 102 on the mobile device 101, are only performed once. The user agent 102 may also be pre-installed on the mobile device 101.

Once the user agent 102 is operational on the mobile device 101, the configuration manager 104 may, at step S212, send a trigger (such as an SMS) to the user agent 102. The trigger sent at step S212 may be sent from the configuration manager 104 to the user agent 102. The trigger may include a campaign configuration pointer that directs the user agent 102 to a computer from which a campaign configuration can be downloaded. Also, the trigger may include a specific sender Mobile Station International Subscriber Directory Number (MSISDN), which the user agent 102 is configured to recognize. The user agent 102 may use the specific MSISDN in the trigger to determine that the trigger contains the campaign configuration pointer. The campaign configuration pointer may be implemented as a URL and may also be referred to as a campaign configuration URL.

A campaign may be understood as one or more tests used to obtain QoS measurement values. An exemplary test could be a call to a particular endpoint or destination telephone number. The campaign configuration may specify configuration parameters of the campaign, e.g., a duration and a type (e.g., voice or data) of campaign. Exemplary campaign configurations are depicted in FIG. 5.

Advantageously, the use of the trigger to begin the campaign may make it unnecessary for the user agent 102 to be connected to the configuration manager 104 at all times. Thus, the trigger may reduce costs and reduce energy consumption of the mobile device 101, since the device can remain in standby mode until the trigger is received. Use of the trigger may also reduce network load since there is no need for a constant connection to be maintained between the configuration manager 104 and the user agent 102.

Optionally, the trigger may be an SMS message. An advantage of the SMS message implementation may be the possibility to specify the campaign configuration pointer in the SMS message. This may improve fault tolerance since the user agent 102 can be directed to a server 110 that is currently operational. In addition, load balancing can be performed using the SMS message. In other words, the user agent 102 can be directed to send QoS measurement values to a server that is able to process data from the mobile device 101 efficiently (e.g., the load on the server is not too heavy). A second trigger can also be used during a campaign to direct the user agent 102 from a first server to a second server, e.g., to migrate from a server that is not operational to a server that is operational or to migrate from a server with a heavy processing load to a server with more available processing capacity. The second trigger may also be implemented as an SMS message. In some cases, the second trigger could be sent by the second server, i.e., the server with more available processing capacity, as an SMS message.

Alternatively, it may be a configuration call from the configuration manager 104 to the mobile device 101. The configuration call may be implemented as a single telephone call. The configuration call may be cheaper than the SMS message; however, it may not be possible to specify a separate campaign configuration pointer as part of the trigger in this case. Accordingly, the user agent 102 may be configured with a default campaign configuration pointer that can be overridden by the SMS trigger, or used if the trigger is a single call from the configuration manager 104. In addition, the configuration call can be used to direct the user agent 102 to the appropriate server. For example, multiple configuration calls can be made to the user agent 102 in order to perform load balancing and/or compensate for a server that is no longer operational.

The user agent 102 may extract the campaign configuration pointer at step S214, then request a campaign configuration at step S216 from a server specified in the campaign configuration pointer. The server specified in the campaign configuration pointer may not necessarily be the configuration manager. The user agent 102 receives the campaign configuration at step S218. The campaign configuration may include configuration parameters. In addition, the campaign configuration may be about 500 bytes.

After the campaign configuration has been received, the user agent 102 may begin measuring QoS in the mobile network 108 under conditions defined by the configuration parameters. Measuring QoS according to the campaign configuration may be referred to as a monitoring campaign or monitoring in automatic mode. The user agent 102 may also monitor normal usage of the mobile device 101 by the user, also referred to as monitoring in passive mode. Monitoring in passive mode may be performed independently of the campaign configuration or at the same time as monitoring in automatic mode. In some cases, monitoring in passive mode may be performed using default (i.e., preconfigured) configuration parameters. Monitoring in passive mode may be performed for a defined period of time.

Monitoring in passive mode may be particularly useful because usage of the mobile device 101 in practice (i.e., by an actual consumer) can be analyzed. For example, in passive mode it is possible to identify a country class of an MSISDN (e.g., the MSISDN is a US telephone number) or a particular mobile operator (e.g., Vodafone), and the call quality associated with the MSISDN or the mobile operator respectively.

Measured data may be sent to the data gathering server 110 at regular intervals and/or at the end of the monitoring campaign at step S222. Step S222 may also be described as sending a plurality of QoS measurement values from the user agent 102 to the data gathering server 110.

Figure 3:
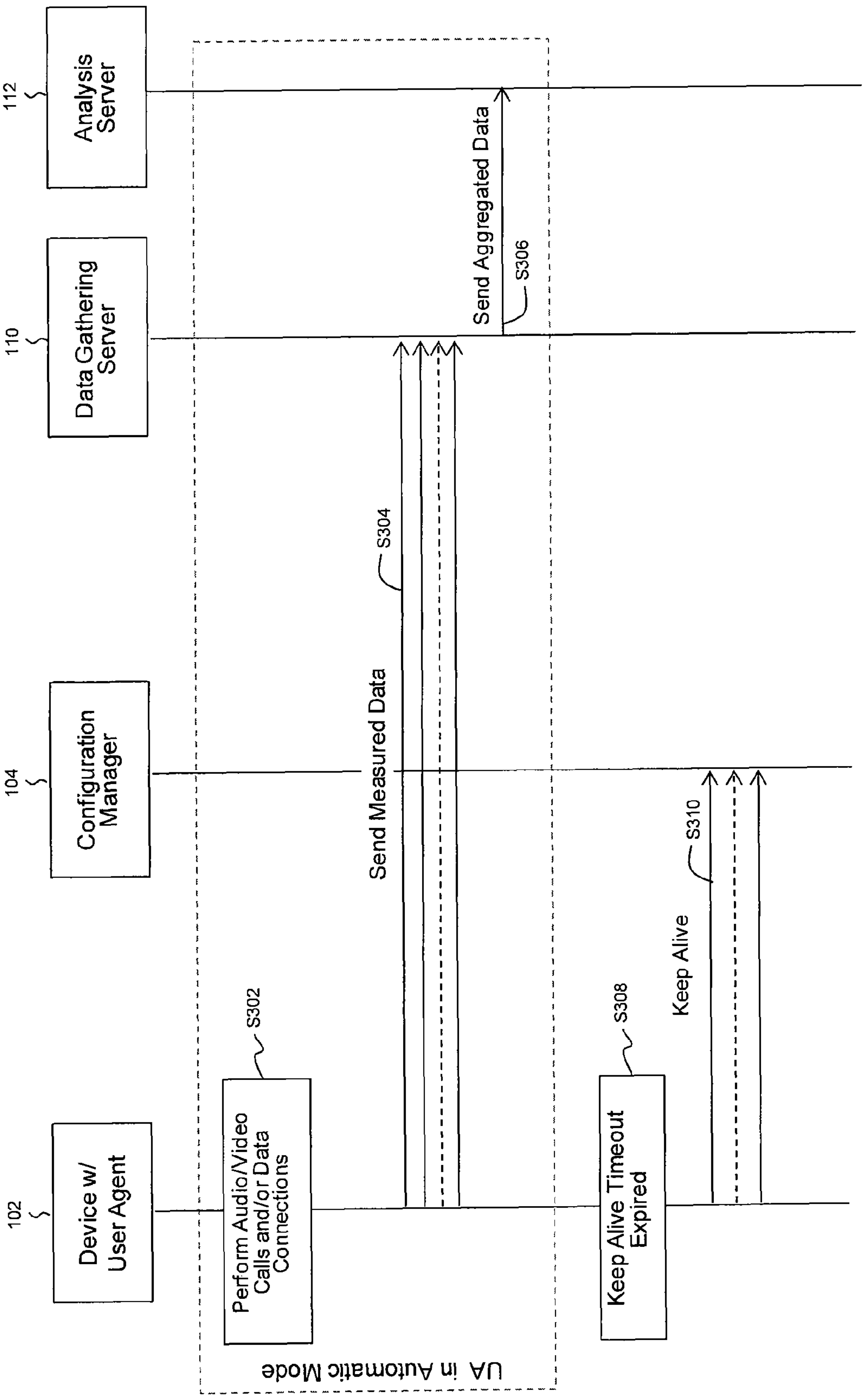
FIG. 3 shows a flow chart of operations within the quality of service monitoring framework when the user agent measures QoS in automatic mode.

FIG. 3 shows a flow chart of operations within the quality of service monitoring framework when the user agent measures QoS in automatic mode. After receiving the campaign configuration at the user agent 102, the monitoring campaign may begin in automatic mode at step S302. Accordingly, the user agent 102 performs audio/video calls and/or data connections. At step S304, the user agent 102 may send data gathered during step S302 to the data gathering server 110. In other words, at step S304, the user agent 102 sends a plurality of QoS measurement values to the data gathering server 110. Step S304 may be performed at the end of the monitoring campaign. At step S306, the data gathering server 110 may send data to the analysis server 112. Step S306 may be performed at defined intervals. The data sent at step S306 may include data received from user agent 102 and may also include data received from other user agents. The data received from the other user agents may also include QoS measurement values.

QoS measurement values obtained from user agents may be taken in a relatively limited area, e.g., when the mobile device 101 is carried by a user who is walking, or over wide ranging geographic area, e.g., when the mobile device 101 is carried by a user in a car or train. The monitoring campaign may be initiated at an arbitrary time or as part of a schedule including multiple monitoring campaigns.

In addition, the user agent 102 may send an indication of a status of the mobile device 101. The indication of the status of the mobile device 101 may be referred to as a keep-alive message. Keep-alive messages may be sent during the monitoring campaign or when no monitoring campaign is running. Furthermore, the keep-alive messages may be used to optimize campaign configuration and device management, and to keep the configuration manager 104 informed about the working status of the mobile device 101 as well as the user agent 102. The keep-alive messages may also be sent to another server, such as the data gathering server 110.

Furthermore, the keep-alive messages may be sent periodically, e.g., every 2 hours. The frequency of the keep-alive messages may vary depending on whether a monitoring campaign is running. According to one example, the keep-alive messages may be sent at a specified frequency (e.g., every 4 hours) during a campaign and less frequently (e.g., only once a day) when the campaign is not ongoing. The frequency that the keep-alive messages are sent can be set from the configuration manager 104. If no keep-alive message is received, the configuration manager 104 may be programmed to send an alert notifying an administrator of relevant information regarding the mobile device 101 that failed to send the keep-alive message.

According to the example depicted in FIG. 3, a timeout may expire at step S308. The user agent 102 may create a Packet Data Protocol (PDP) context for the keep-alive message, and establish a connection to the configuration manager 104. At step S310, the user agent 102 sends the keep-alive message to the configuration manager 104.

Advantageously, the keep-alive messages from the user agent 102 may be used to build a map including the location of the mobile device 101 corresponding to user agent 102. According to one example, if there are a number of user agents being monitored, then the keep-alive messages from all the monitored user agents can be used to generate a map of all active user agents. The map can be used for service insurance and service maintenance, e.g., as a guarantee that the mobile network 108 is operational.

Figure 4:
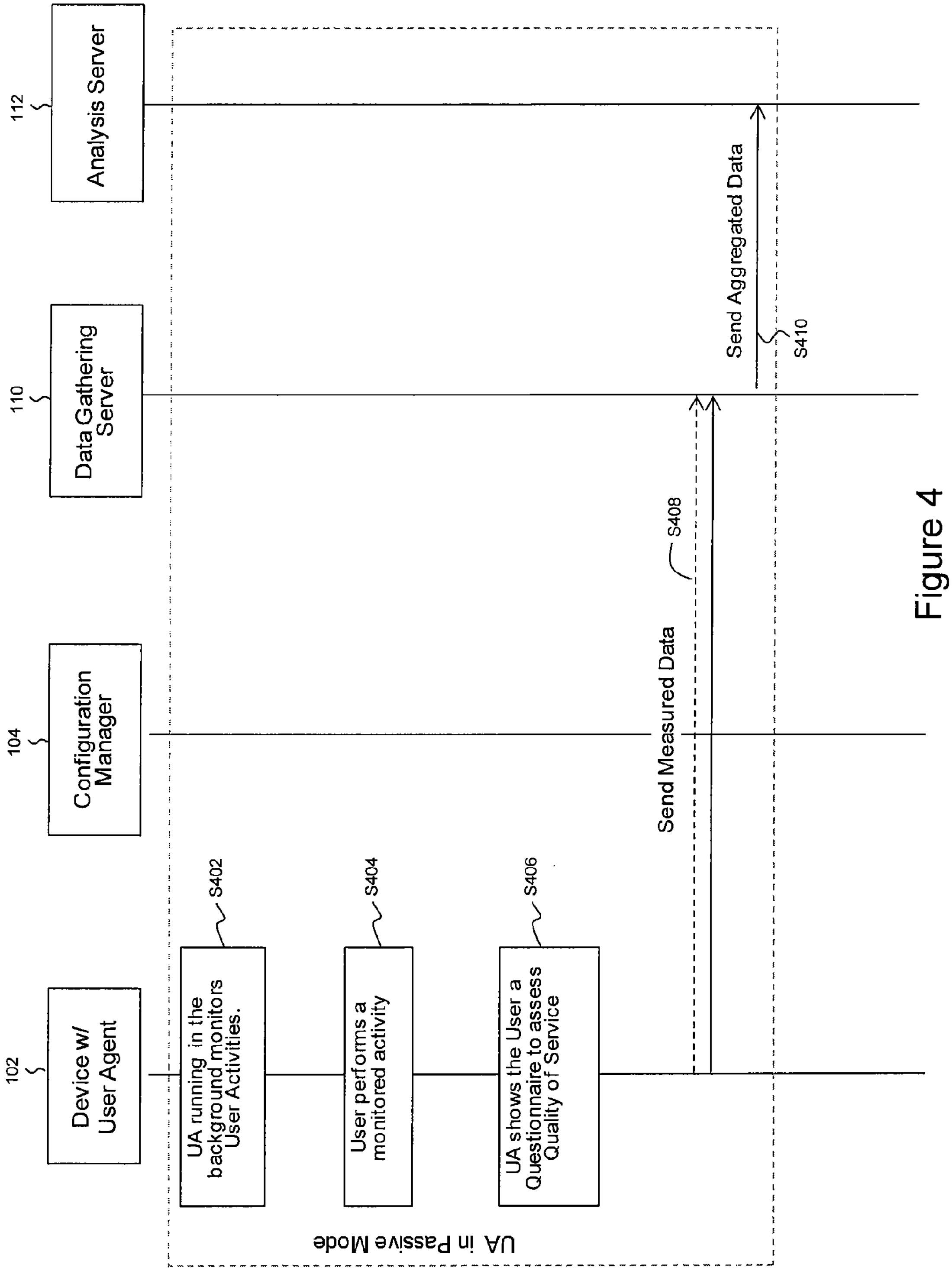
FIG. 4 shows a flow chart of operations within the quality of service monitoring framework when the user agent measures QoS in passive mode.

FIG. 4 shows a flow chart of operations within the quality of service monitoring framework when the user agent measures QoS in passive mode. At step S402, the user agent 102 may begin measuring QoS in passive mode. In passive mode, the user agent 102 can monitor normal usage of the mobile device 101. Normal usage may be defined as typical, day-to-day operation of the mobile device 101, possibly by the user of the mobile device 101. Normal usage may include data traffic and/or audio/video calls. At step S404, a monitored action may occur or may be performed by the user. The monitored action may correspond to a predefined QoS parameter. For example, the monitored action may be that an audio call is dropped. Accordingly, the reason for the dropped call may be stored on the mobile device 101 as a QoS measurement value.

At step S406, the user may be queried by one or more screens in a Graphical User Interface (GUI) in order to determine a perceived QoS and/or a characteristic of a location where the mobile device 101 was used. In some cases, these values may be obtained at the end of a voice call. Step S406 may occur after a period of time configured by the configuration manager 104. The perceived QoS may be a qualitative evaluation obtained by requesting the user to define a measure of perceived quality, e.g., by selecting from excellent, good, fair, or poor. Characteristics of the location may define a property of the user's location. Location characteristics may include values such as office, city, indoor, outdoor, car, railway, elevator, or a combination of these values. The perceived QoS may also include a quantitative evaluation, e.g., a mean opinion score (MOS) between 1 and 5.

A response to the user query may be useful for configuring the mobile network 108 and/or determining areas of the mobile network 108 that could be improved. A perceived throughput may also be measured, based on the amount of data exchanged per unit of time, possibly depending on "bursts" of data. Determining perceived QoS may be a cost effective way of measuring QoS in the mobile network 108. Perceived QoS may also be considered a QoS parameter.

At step S408, user query data obtained directly from the user and data obtained from the mobile device 101 by the user agent 102 may be sent to the data gathering server 110. The data obtained directly from the user may be compared with data obtained from the user agent 102, e.g., on the data gathering server 110. In addition, data obtained directly from the user, from the user agent 102, and data obtained from the mobile network 108, e.g., a call detail record (CDR) obtained by a service provider, may be compared. The comparison may be both in terms of calls and data services.

The comparison may achieve a synergistic effect, since the user query data, the user agent data, and the mobile network data may be more useful together than any part is individually. The comparison may be particularly useful since each part being compared may provide different results. For example, the user query data and the user agent data may provide different results regarding QoS in a particular area of the mobile network. Profiling and data mining may also be performed, in order to determine for example, Quality of Experience, how the user reacts to receiving an SMS, and other data.

In a particular example, data obtained from the user query can be combined with cell identifier and/or GPS information to gain insight into a specific section of the mobile network 108. Accordingly, perceived QoS can be correlated with a geographic location.

At step S410, data may be sent to the analysis server 112. In some embodiments, a web server may provide a Graphical User Interface (GUI), accessible by a web browser, which allows reports and statistics to be generated based on data uploaded by user agents (e.g., user agent 102). The web server may hosted on the analysis server 112. The GUI allows operators to compose charts and apply one or more filters to the Quality of Service measurement values collected by the user agent 102. In particular, the following charts and filtered data may be generated:

Uplink & downlink bandwidth average filtered by cell id
Uplink & downlink bandwidth average filtered MSISDN
Call setup time average by cell id
Call setup time average by MSISDN
Received (i.e., downlink) signal power by cell id
Number of voice calls by cell id
Number of voice calls without failure by cell id
Number of voice calls without failure by MSISDN
MOS by cell id
MOS by MSISDN;
Geographical position of voice and data session.

For each chart an X-axis component and the Y-axis component could be specified. For example, there may be a graph with the Cell_ID's on the X-axis and the call setup times on the Y-axis. Accordingly, the setup-time may be collected by the user agent 102 (e.g., via the Telephony API). The user agent 102 then sends the setup time, together with other QoS measurement parameters to the data gathering server 110. Then the user, via the GUI, can create a graph showing the call setup time average for each Cell ID. The setup time average may represented as an arithmetical average: sum of setup times/quantity. In addition to the filters and charts, the GUI may allow the selection of a time slot to generate statistics on measurements collected in a specific period of time.

FIG. 5 shows exemplary voice and data campaign configurations 500. In the example of FIG. 5, a configuration document includes voice and data campaign configurations 500. The configuration document is written using Extensible Markup Language (XML) according to a Document Type Definition (DTD) depicted in FIG. 6; however, other implementations are possible.

A first campaign 501 has a type 502 indicating a voice campaign. The voice campaign may involve measuring QoS for audio and/or video calls. The voice campaign may include multiple voice sessions. A role 504 specifies that the user agent 102 will be the caller. For example, the user agent 102 will call the data gathering server 110. When the user agent 102 is configured in the caller role, the user agent 102 will generate voice calls automatically according to the configuration parameters 500. Alternatively, the role 504 could indicate that the user agent 102 will be called. In the alternative, the user agent would perform QoS measurements based on calls from the data gathering server 110 to the mobile device 101. In the present example, the role 504 is only applicable to voice campaigns. The type 502 may also be used to indicate a hybrid campaign, i.e., a monitoring campaign including both voice and data traffic.

A call 506 indicates a telephone number of a call endpoint for the voice campaign. Furthermore, a campaign start 508 and a campaign end 510 respectively indicate the start and end times of the monitoring campaign. The voice campaign may consist of a number of sessions. Each session has a finite duration and involves transmission of data. Accordingly, a frequency 512 indicates how often a session is initiated. Thus, in the example depicted in FIG. 5, the frequency 512 indicates that a session is initiated every 200 seconds. A session_duration 514 specifies that each session lasts for 60 seconds. Thus, each session involves a call from the mobile device 101 to the call endpoint.

A sampling frequency 516 specifies how often QoS measurement values are obtained by means of the platform dependent API during each session. Thus, the sampling frequency depicted in FIG. 5 indicates that QoS measurement values are sampled every second. In other words, the sampling frequency 516 indicates the frequency and duration of QoS measurements.

A log frequency 518 determines how often logs containing QoS measurement values are forwarded to the data gathering server 110, i.e., every 3600 seconds in the example depicted. Until logs are forwarded to the data gathering server 110, they may be stored on the user agent 102. Logs may be forwarded to the data gathering server 110 in a variety of ways, including WiFi, Universal Mobile Telecommunications System (UMTS) and SMS. Accordingly, the platform dependent API may be queried multiple times and multiple QoS measurement values may be obtained before the QoS measurement values are sent to the data gathering server 110.

A second campaign 519 has a type 520 indicating a data campaign. The data campaign may include multiple data sessions. Accordingly, a URL 522 specifies an endpoint URL for the data campaign. In each data session, the user agent 102 may create a PDP context and connect to the URL 522. Thus, in the example depicted, the campaign consists of 200 sessions, starting at 27 Jan. 2010 18:00:00 and ending at 28 Jan. 2010 10:00:00. Each session lasts 10 seconds, and each session involves a Hypertext transfer protocol (HTTP) connection to the endpoint URL http://www.company_name_abc123.com. Identically named tags in the first campaign 501 and the second campaign 519 have identical functions unless otherwise specified.

FIG. 6 shows a DTD for voice and data campaign configurations. The exemplary DTD depicted includes a set of markup declarations that define a document type for the XML document of FIG. 5. The DTD declares which elements and references may appear where in the voice and data campaign configurations 500. The DTD also specifies what the elements' contents and attributes are. As an alternative to the DTD depicted in FIG. 6, an XML schema could be used.

FIG. 7 shows an HTTP keep-alive message sent from the user agent 102 to the configuration manager 104. The user agent 102 may also be configured to send keep-alive messages to an additional or alternative server.

The exemplary HTTP keep-alive message depicted includes an International Mobile Equipment Identity (IMEI), and a Mobile Station International Subscriber Directory Number (MSISDN). An error_code 702 is provided by the user agent 102. For example, the error_code 702 may be one of the following:

| | |
|---|---|
| 0: | no error |
| 100-199: | errors in a voice campaign |
| 200-299: | errors in a data campaign |
| 300-399: | errors on devices (e.g., GPS, radio) |
| 400-499: | power supply errors |
| 500: | other errors |

A time 704 indicates a time when the most recent error occurred. The time 704 may be expressed in Unix time, i.e., as the number of seconds elapsed since midnight proleptic Coordinated Universal Time (UTC) of Jan. 1, 1970, not counting leap seconds. In some embodiments, the keep-alive message may be sent as an HTTP post request.

A free_memory 706 indicates free storage space on the mobile device 101 in bytes. It may be advantageous to track storage space on the mobile device 101 in order to ensure that sufficient storage capacity remains available to store data form the user agent 102.

A last_measure 708 denotes a time when QoS measurement values were most recently obtained. A last_measurement_day 710 denotes a number of QoS measurements performed by the user agent 102 over the last 24 hours.

The HTTP keep-alive message may be advantageous because more data can be included in an HTTP message than in an SMS message or a voice call. The data included in the HTTP keep-alive message may be useful for managing the user agent 102.

FIG. 8 shows an SMS keep-alive message sent from the user agent 102 to the configuration manager 104. Keep-alive messages may also be sent from the user agent 102 to the configuration manager 104 using SMS. Since an SMS message is generally limited to 160 bytes, the SMS keep-alive message may not contain as much data as the HTTP keep-alive message. However, the SMS keep-alive message may be cheaper or more convenient to send.

The SMS message depicted includes error_code, time and free_memory data. These data elements may have the functionality as described with respect to FIG. 7 for the equivalent elements of the HTTP message.

The keep-alive message sent from the user agent 102 to the configuration manager 104 may also be implemented as a voice call. The voice call may only include the MSISDN of the caller, however, the voice call may be cheaper than either the SMS message or the HTTP message.

FIG. 9 shows exemplary QoS parameters and corresponding QoS measurement values that may be obtained by the user agent 102. The QoS parameters may include radio parameters and/or service parameters. The QoS measurement values may be sent from the user agent 102 to the data gathering server 110 during a voice campaign in the manner depicted in FIG. 10.

A field column 902 includes 22 rows of QoS parameters, i.e., QoS parameters 905-942. A value column 904 includes QoS measurement values corresponding to the QoS parameters listed in the field column 902. The QoS measurement values listed in the value column 904 may be obtained according to the corresponding QoS parameters listed in the field column 902, by means of at least one platform dependent API on the mobile device 101.

According to the example depicted, an International Mobile Equipment Identity (IMEI) 905 corresponds to the mobile device 101. Furthermore, an International Mobile Subscriber Identity (IMSI) 906 corresponds to a Subscriber Identity Module (SIM) of the mobile device 101. A remote_party 908 corresponds to the call 506.

Furthermore, a dialling_ts 910 specifies a time a voice session was initiated and a dialling_ts_mills 912 specifies milliseconds corresponding to the dialling_ts 910. In other words, the dialing_ts 910 and the dialing_ts_mills 912 specify a time call setup started.

A disconnecting_ts 914 indicates a time that the voice session was disconnected and a disconnecting_ts_mills 916 indicates the milliseconds corresponding to the disconnecting_ts 914. The disconnecting_ts 914 and the disconnecting_ts_mills 916 may be used when a call is dropped. In other words, disconnecting_ts 914 and disconnecting_ts_mills 916 indicate when a call ended.

An exit_code 916 can provide a reason a call was disconnected, e.g., the call was dropped because the mobile device 101 went outside a range administered by a service provider. The exit_code 916 may be an abstraction since different mobile device 101 operating systems generally provide different sets of exit codes. Thus, it may be helpful to map the exit_code 916 to a corresponding description. The exit_code 916 may also be a global system for mobile communications (GSM) specification code. GSM specification codes are defined according to GSM or 3rd Generation Partnership Project (3GPP) specifications.

Moreover, a direction 920 may correspond to the role 504, and thus indicates whether the mobile device 101 is a caller, or the mobile device 101 is being called. A location 922 may be a location area code (LAC), a Broadcast Channel Control (BCCH) parameter.

Continuing with the example, cell_id 924 may identify a radio cell (or cell) of the mobile network 108 where the mobile device 101 was located between the dialling_ts 910 and the disconnecting_ts 914. Accordingly, the user agent 102 may be able to identify a cell corresponding to the current location of the mobile device 101, as well as adjacent cells, possibly based on information used by the mobile device 101 for making a handover from one cell to another cell. The user agent 102 may also be able to obtain information on cell overlap.

A mode 926 may specify communications information corresponding to the mobile device 101. Accordingly, the mode 926 may indicate a telecommunications technology, such as GMS, or Universal Mobile Telecommunications System (UMTS). The mode 926 may also indicate a radio bearer used by the mobile device 101 hosting the user agent 102. The radio bearer may specify which particular radio technology is used, such as GSM, UMTS, Wideband Code Division Multiple Access (W-CDMA), High Speed Downlink Packet Access (HSDPA), or any other mobile communication technology. Furthermore, the mode 926 may specify information regarding the radio frequency being used to communicate. The mode 926 may be a number mapped to a corresponding description.

In addition, an MCC 928 may specify a Mobile Country Code (MCC). For example, the QoS measurement value in column 904 corresponding to the MCC 928 is 222, which is the MCC for Italy. An MNC 930 may specify a Mobile Network Code (MNC). For example, the QoS measurement value in column 904 corresponding to the MNC 930 is 01, which is the MNC for Telecom Italia.

A band 932 may indicate information about a frequency used by the user agent 102, e.g., 900 MHz, 1800 MHz, or 1900 MHz. The band 932 may also be a mapped value and may be related to the mode 926.

According to the example, a registration_status 934 is the characteristic of the mobile device 101 when searching for a mobile network, e.g., idle, connected, unknown, registered with service. The registration_status 934 can assist in evaluation of processes used by mobile device 101*s* to connect and/or log in to a service provider. In addition, the registration_status may reflect whether roaming is taking place. If roaming is taking place, QoS measurements could be influenced by a roaming partner.

In addition, a signal_level 936 may correspond to a received signal strength indicator (RSSI), a BCCH parameter. The signal_level is generally expressed as an absolute value (e.g., decibel milliwatt, dBm). A signal_bar 938 may correspond to a number of bars displayed on the mobile device 101, e.g., bars beside an antenna sign on a mobile display. The signal_bar 938 generally depends on the specific phone used.

A connected_ts 940 and a connected_ts_mills 942 (milliseconds corresponding to connected_ts 940) may indicate a time when a call was answered (i.e., connected). Subtracting the dialing_ts 910 from the connected_ts 940 results in a ringing time.

FIG. 10 shows exemplary QoS measurement values 1000 sent from the user agent 102 to the server 110. Accordingly, QoS measurement values 1000 may be delimited by semicolons and sent as plain text. In some implementations, the QoS measurement values 1000 may be sent by means of an HTTP POST request. Other implementations are also possible. Line 1002 and line 1004 are displayed as two separate lines for easier viewing; however, these two lines would normally be sent as a single line. The values in lines 1002 and 1004 may correspond to the values depicted in the value column 904. For example, the values 222014401303279 and 356795020356312 in line 1002 correspond to IMSI 906 and IMEI 905 respectively.

A connected line 1006 includes the connected_ts 940 and the connected_ts_mills 942. Thus, lines 1002 to 1006 may be understood to correspond to the session with the session duration 514 of 60 seconds.

Survey line 1008 may include the user query data resulting from a query displayed to user after a monitored connection is ended. Accordingly, the survey line 1008 may include values for a Mean Opinion Score (MOS), a perceived quality, and/or a location characteristic.

A network line 1010 may represent a sample of previous QoS measurements values and may include some of the most useful measurement values, such as values corresponding to BCCH parameters. In particular, the network line 1010 may include information about a change of carrier or a cell handoff (also referred to as a cell handover). In some embodiments, the information in the network line 1010 may be tracked or logged for each sample during the session. For example, with the sampling frequency 516 of 1 per second (i.e., 1 Hz) and the session duration 514 of 60 seconds, there would a network line 1010 for each sample for a total of 60 network lines. A GPS line 1014 may include position data, e.g., coordinates of the mobile device 101.

Figure 11:
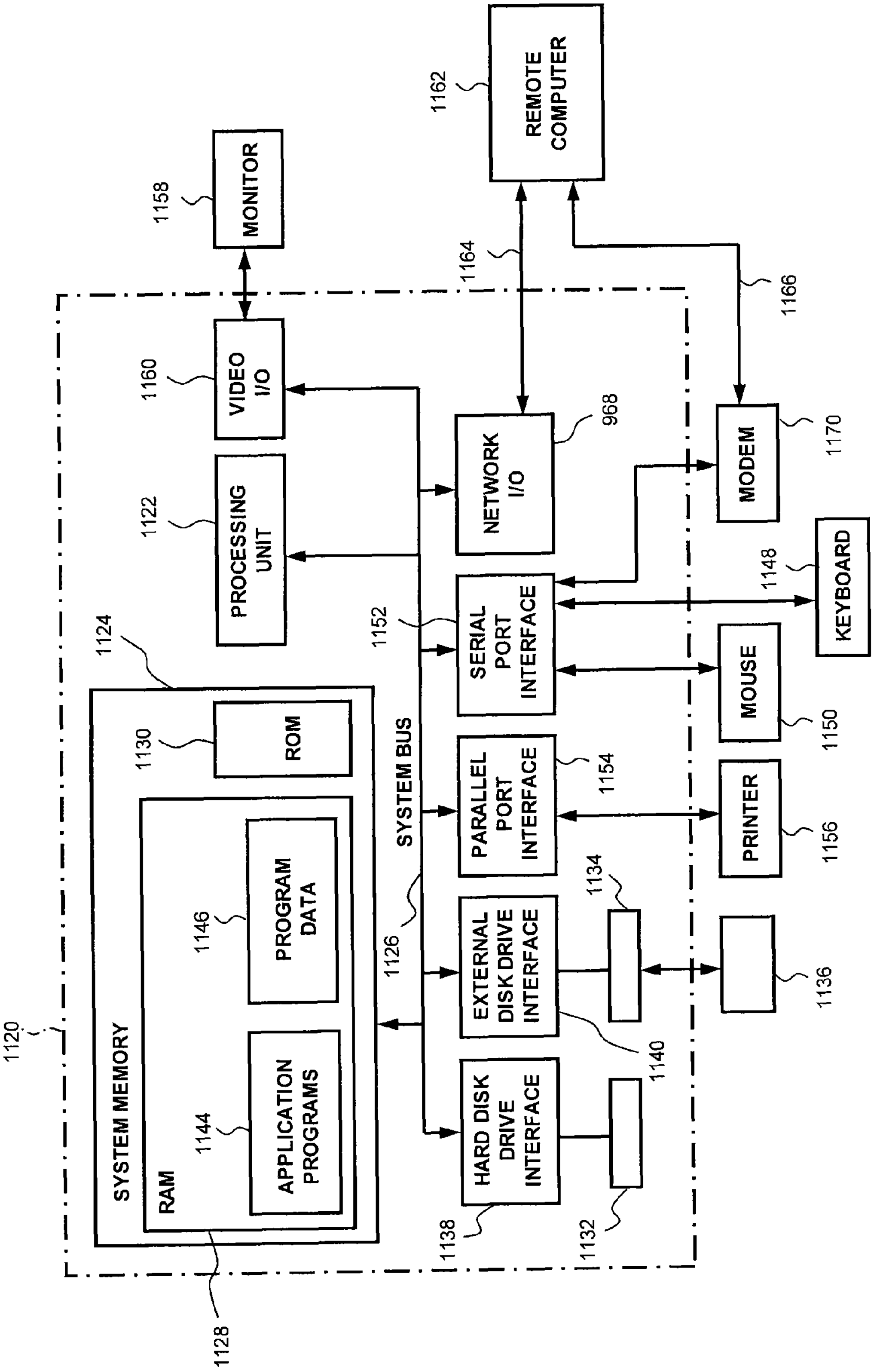
FIG. 11 shows an exemplary system for measuring QoS in a mobile network.

FIG. 11 shows an exemplary system for measuring QoS in a mobile network, including a general purpose computing device in the form of a conventional computing environment 1120 (e.g. a personal computer). The conventional computing environment includes a processing unit 1122, a system memory 1124, and a system bus 1126. The system bus couples various system components including the system memory 1124 to the processing unit 1122. The processing unit 1122 may perform arithmetic, logic and/or control operations by accessing the system memory 1124. The system memory 1124 may store information and/or instructions for use in combination with the processing unit 1122. The system memory 1124 may include volatile and non-volatile memory, such as a random access memory (RAM) 1128 and a read only memory (ROM) 1130. A basic input/output system (BIOS) containing the basic routines that helps to transfer information between elements within the personal computer 1120, such as during start-up, may be stored in the ROM 1130. The system bus 1126 may be any of several types of bus structures including a memory bus or memory controller, a peripheral bus, and a local bus using any of a variety of bus architectures.

The personal computer 1120 may further include a hard disk drive 1132 for reading from and writing to a hard disk (not shown), and an external disk drive 1134 for reading from or writing to a removable disk 1136. The removable disk may be a magnetic disk for a magnetic disk driver or an optical disk such as a CD ROM for an optical disk drive. The hard disk drive 1132 and the external disk drive 1134 are connected to the system bus 1126 by a hard disk drive interface 1138 and an external disk drive interface 1140, respectively. The drives and their associated computer-readable media provide non-volatile storage of computer readable instructions, data structures, program modules and other data for the personal computer 1120. The data structures may include relevant data for the implementation of the method for measuring Quality of Service (QoS), as described above. The relevant data may be organized in a database, for example a relational database management system or a object-oriented database management system.

Although the exemplary environment described herein employs a hard disk (not shown) and an external disk 1136, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 1136, ROM 1130 or RAM 1128, including an operating system (not shown), one or more application programs 1144, other program modules (not shown), and program data 1146. The application programs may include at least a part of the functionality as depicted in FIGS. 1 to 10.

A user may enter commands and information, as discussed below, into the personal computer 1120 through input devices such as keyboard 1148 and mouse 1150. Other input devices (not shown) may include a microphone (or other sensors), joystick, game pad, scanner, or the like. These and other input devices may be connected to the processing unit 1122 through a serial port interface 1152 that is coupled to the system bus 1126, or may be collected by other interfaces, such as a parallel port interface 1154, game port or a universal serial bus (USB). Further, information may be printed using printer 1156. The printer 1156, and other parallel input/output devices may be connected to the processing unit 1122 through parallel port interface 1154. A monitor 1158 or other type of display device is also connected to the system bus 1126 via an interface, such as a video input/output 1160. In addition to the monitor, computing environment 1120 may include other peripheral output devices (not shown), such as speakers or other audible output.

The computing environment 1120 may communicate with other electronic devices such as a computer, telephone (wired or wireless), personal digital assistant, television, or the like. To communicate, the computer environment 1120 may operate in a networked environment using connections to one or more electronic devices. FIG. 11 depicts the computer environment networked with remote computer 1162. The remote computer 1162 may be another computing environment such as a server, a router, a network PC, a peer device or other common network node, and may include many or all of the elements described above relative to the computing environment 1120. The logical connections depicted in FIG. 11 include a local area network (LAN) 1164 and a wide area network (WAN) 1166. Such networking environments are commonplace in offices, enterprise-wide computer networks, intranets and the Internet and may particularly be encrypted.

When used in a LAN networking environment, the computing environment 1120 may be connected to the LAN 1164 through a network I/O 1168. When used in a WAN networking environment, the computing environment 1120 may include a modem 1170 or other means for establishing communications over the WAN 1166. The modem 1170, which may be internal or external to computing environment 1120, is connected to the system bus 1126 via the serial port interface 1152. In a networked environment, program modules depicted relative to the computing environment 1120, or portions thereof, may be stored in a remote memory storage device resident on or accessible to remote computer 1162. Furthermore other data relevant to the method for optimization of evaluation of a policy (described above) may be resident on or accessible via the remote computer 1162. It will be appreciated that the network connections shown are exemplary and other means of establishing a communications link between the electronic devices may be used. The above-described computing system is only one example of the type of computing system that may be used to implement the method for measuring Quality of Service (QoS).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer-implemented method of measuring Quality of Service (QoS) in a mobile network, the method comprising:

accessing, via a communications interface coupled to a processor, a platform dependent Application Programming Interface (API) on a mobile device;

obtaining, by the processor executing the mobile device API, according to a set of QoS parameters, a first plurality of QoS measurement values from the mobile device; and sending, by the processor executing the mobile device API, the first plurality of QoS measurement values to a first server;

receiving, via the communication interface, a first trigger at the mobile device;

downloading, via the processor, configuration parameters to the mobile device in response to the first trigger; and wherein obtaining the first plurality of QoS measurement values is performed by the processor under conditions defined by the configuration parameters;

receiving, via the communications interface using the processor, a second trigger at the mobile device, wherein the second trigger includes a second pointer to a second server;

obtaining, by the processor executing the mobile device API, according to the set of QoS parameters, a second plurality of QoS measurement values from the mobile device; and sending, by the processor executing the mobile device API, the second plurality of QoS measurement values to the second server.

2. The method of claim 1, wherein the set of QoS parameters include any one or more of the following in any combination:

a cell identifier;

a received signal strength indication;

an absolute radio frequency channel number;

power of a signal on a primary common pilot channel;

position data obtained using a global navigation satellite system;

received signal code power; and volume of data transmitted and received.

3. The method of claim 1, wherein the first trigger is an SMS message, and wherein the SMS message includes a pointer to a first server.

4. The method of claim 1, wherein obtaining the first plurality of QoS measurement values is carried out by monitoring normal usage of the mobile device.

5. The method of claim 1, further comprising communicating an indication of a status of the mobile device to the first server.

6. The method of claim 5, wherein the indication includes more than 160 bytes of data.

7. The method of claim 1, wherein the mobile device includes a Symbian operating system, and the platform dependent API uses Symbian C++; or the mobile device includes an Android operating system, and the platform dependent API uses an Android Java library; or the mobile device includes a Windows Mobile operating system, and the platform dependent API uses C++; or the mobile device includes a Blackberry operating system, and the platform dependent API uses a Blackberry Java library.

8. The method of claim 1, wherein the configuration parameters comprise a type parameter, and wherein the type parameter indicates that the first plurality of QoS measurement values are obtained by measuring QoS for at least one of the following: audio calls, and video calls.

9. The method of claim 1, wherein the configuration parameters comprise a sampling frequency, and wherein the sampling frequency specifies an amount of time between obtaining a first part of the first plurality of QoS measurement values and a second part of the first plurality of QoS measurement values.

10. A computer-implemented method of measuring Quality of Service (QoS) in a mobile network, the method comprising:

accessing, via a communications interface coupled to a processor, a platform dependent Application Programming Interface (API) on a mobile device;

obtaining, by the processor executing the mobile device API, according to a set of QoS parameters, a first plurality of QoS measurement values from the mobile device; and sending, by the processor executing the mobile device API, the first plurality of QoS measurement values to a first server;

receiving, via the communication interface, a response to a query of a user of the mobile device, wherein the response includes a quality of service perceived by the user, and/or a characteristic of a location where the mobile device was used;

obtaining, by the processor executing the mobile device API, a second plurality of QoS measurement values from the mobile network; and comparing, by the processor executing the mobile device API, the first plurality of QoS measurement values, the response to the query, and the second plurality of QoS measurement values.

11. A computer program product comprising:

computer-readable instructions stored on a non-transitory memory coupled to a processor, wherein the computer-readable instructions when executed by the processor:

access via the processor a platform dependent Application Programming Interface (API) on the device;

obtain, via a communications interface, by executing the API, according to a set of Quality of Service (QoS) parameters a first plurality of QoS measurement values from a mobile device; and send, via the communications interface, the first plurality of QoS measurement values to a first server;

receive, via the communication interface, a first trigger at the mobile device:

download, via the processor, configuration parameters to the mobile device in response to the first trigger; and wherein obtaining the first plurality of QoS measurement values is performed by the processor under conditions defined by the configuration parameters;

receive, via the communications interface using the processor, a second trigger at the mobile device, wherein the second trigger includes a second pointer to a second server;

obtain, by the processor executing the mobile device API, according to the set of QoS parameters, a second plurality of QoS measurement values from the mobile device; and send, by the processor executing the mobile device API, the second plurality of QoS measurement values to the second server.

12. The computer program product of claim 11, wherein the computer-readable instructions further cause the processor to:

access, via the communications interface using the processor, a platform dependent API on the mobile device;

obtain, by the processor executing the mobile device API, according to a set of QoS parameters, a first plurality of QoS measurement values from the mobile device; and send, by the processor executing the mobile device API, the first plurality of QoS measurement values to a first server.

13. The computer program product of claim 11, wherein the set of QoS parameters include any one or more of the following in any combination:

a cell identifier;

a received signal strength indication;

an absolute radio frequency channel number;

power of a signal on a primary common pilot channel;

position data obtained using a global navigation satellite system;

received signal code power; and volume of data transmitted and received.

14. The computer program product of claim 11, wherein the computer-readable instructions further cause the processor to: obtain the first plurality of QoS measurement values by monitoring normal usage of the mobile device.

15. The computer program product of claim 11, wherein the computer-readable instructions further cause the processor to: communicate an indication of a status of the mobile device to the first server.

16. The computer program product of claim 11, wherein the mobile device includes a Symbian operating system, and the platform dependent API uses Symbian C++; or the mobile device includes an Android operating system, and the platform dependent API uses an Android Java library; or the mobile device includes a Windows Mobile operating system, and the platform dependent API uses C++; or the mobile device includes a Blackberry operating system, and the platform dependent API uses a Blackberry Java library.

17. A device comprising:

a memory coupled to a processor, the memory having stored thereon:

a platform dependent Application Programming Interface (API) executable by the processor;

the processor operable to:

access the platform dependent Application Programming Interface (API) on the device;

obtain, via a communications interface, by executing the API, according to a set of Quality of Service (QoS) parameters, a first plurality of QoS measurement values from a mobile device; and send, via the communications interface, the first plurality of QoS measurement values to a first server;

receive, via the communication interface, a first trigger at the mobile device;

download, via the processor, configuration parameters to the mobile device in response to the first trigger; and wherein obtaining the first plurality of QoS measurement values is performed by the processor under conditions defined by the configuration parameters;

receive, via the communications interface using the processor, a second trigger at the mobile device, wherein the second trigger includes a second pointer to a second server;

obtain, by the processor executing the mobile device API, according to the set of QoS parameters, a second plurality of QoS measurement values from the mobile device; and send, by the processor executing the mobile device API, the second plurality of QoS measurement values to the second server.

18. The device of claim 17, the device further operable to:

access, via the communications interface using the processor, a platform dependent API on the mobile device;

obtain, by the processor executing the mobile device API, according to a set of QoS parameters, a first plurality of QoS measurement values from the mobile device by; and send, by the processor executing the mobile device API, the first plurality of QoS measurement values to a first server.

19. The device of claim 17, wherein the set of QoS parameters include any one or more of the following in any combination:

a cell identifier;

a received signal strength indication;

an absolute radio frequency channel number;

power of a signal on a primary common pilot channel;

position data obtained using a global navigation satellite system;

received signal code power; and volume of data transmitted and received.

20. The device of claim 17, further configured to: obtain the first plurality of QoS measurement values by monitoring normal usage of the mobile device.

21. The device of claim 17, further configured to:

communicate an indication of a status of the mobile device to the first server.

22. The device of claim 17, wherein the mobile device includes a Symbian operating system, and the platform dependent API uses Symbian C++; or the mobile device includes an Android operating system, and the platform dependent API uses an Android Java library; or the mobile device includes a Windows Mobile operating system, and the platform dependent API uses C++; or the mobile device includes a Blackberry operating system, and the platform dependent API uses a Blackberry Java library.

* * * * *

UNITED STATES PATENT AND TRADEMARK OFFICE

CERTIFICATE OF CORRECTION

PATENT NO. : 8,798,611 B2
APPLICATION NO. : 13/024132
DATED : August 5, 2014
INVENTOR(S) : Giuseppe Capuozzo et al.

It is certified that error appears in the above-identified patent and that said Letters Patent is hereby corrected as shown below:

On the Title Page

Right column, item (56), under "FOREIGN PATENT DOCUMENTS", replace "11/2007" with --10/2007--.

In the Specification

In column 6, line 39, after "class in the" replace "etel3rdparty Jib" with --etel3rdparty.lib--.

Signed and Sealed this
First Day of September, 2015

Michelle K. Lee
*Director of the United States Patent and Trademark Office*